United States Patent
Prebble

(10) Patent No.: US 6,192,157 B1
(45) Date of Patent: Feb. 20, 2001

(54) MODIFICATIONS OF POSTSCRIPT ADAPTIVE DATA COMPRESSION (ADC) FOR 3 PLANE, 8 BIT COLOR IMAGES, JPEG LOSSY COMPRESSION, AND VARIABLE Q FACTORS

(75) Inventor: Timothy M. Prebble, Meridian, ID (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/181,075

(22) Filed: Oct. 27, 1998

(51) Int. Cl.[7] ............................... G06K 9/36; G06K 9/46
(52) U.S. Cl. ...................... 382/239; 358/1.16; 382/251
(58) Field of Search .......................... 341/51; 348/395.1, 348/404.1, 405.1, 419.1, 420.1; 358/1.15, 1.16, 261.2, 430, 432, 433, 1.13, 1.17, 1.1; 375/240.02–240.07, 240.18, 240.2, 240.24; 382/232, 239, 248, 250, 251, 305

(56) References Cited

U.S. PATENT DOCUMENTS

| 5,450,562 | 9/1995 | Rosenberg et al. . |
| 5,479,587 | 12/1995 | Campbell et al. . |
| 5,544,290 | * 8/1996 | Gentile ................................ 358/1.15 |
| 5,602,976 | * 2/1997 | Cooper et al. ...................... 358/1.15 |
| 5,677,689 | 10/1997 | Yovanof, et al. . |
| 5,680,129 | 10/1997 | Weinberger et al. . |
| 5,708,732 | 10/1998 | Merhav, et al. . |
| 5,729,668 | 3/1998 | Claflin et al. . |
| 5,754,704 | 5/1998 | Barnsley et al. . |
| 5,754,750 | 5/1998 | Butterfield et al. . |
| 5,801,720 | 9/1998 | Norrod et al. . |
| 5,818,364 | 10/1998 | Hintzman et al. . |

* cited by examiner

Primary Examiner—Amelia Au
Assistant Examiner—Timothy M. Johnson

(57) ABSTRACT

An image compression system includes a source, a memory, a personality/graphics engine having a personality and a graphics engine, a memory allocator and an image processor. The source is operative to supply digital data representative of images. The memory has a finite size for receiving the digital data. The personality is configured to interpret an input file and is operative to construct image patches from the digital data. The graphics engine is operative to generate a display list from the memory. The memory allocator is associated with the memory and is operative to allocate image patches. The image processor includes a JPEG compressor and a JPEG decompressor. The image processor is operative to render the display list into strip buffers. The JPEG compressor is operative to JPEG compress images on the display list. The JPEG decompressor is operative to decompress compressed images on the display list. The image processor is operative to uncompress the compressed patch data and copy each bit in the image patch into the strip buffers. A method is also disclosed.

20 Claims, 4 Drawing Sheets

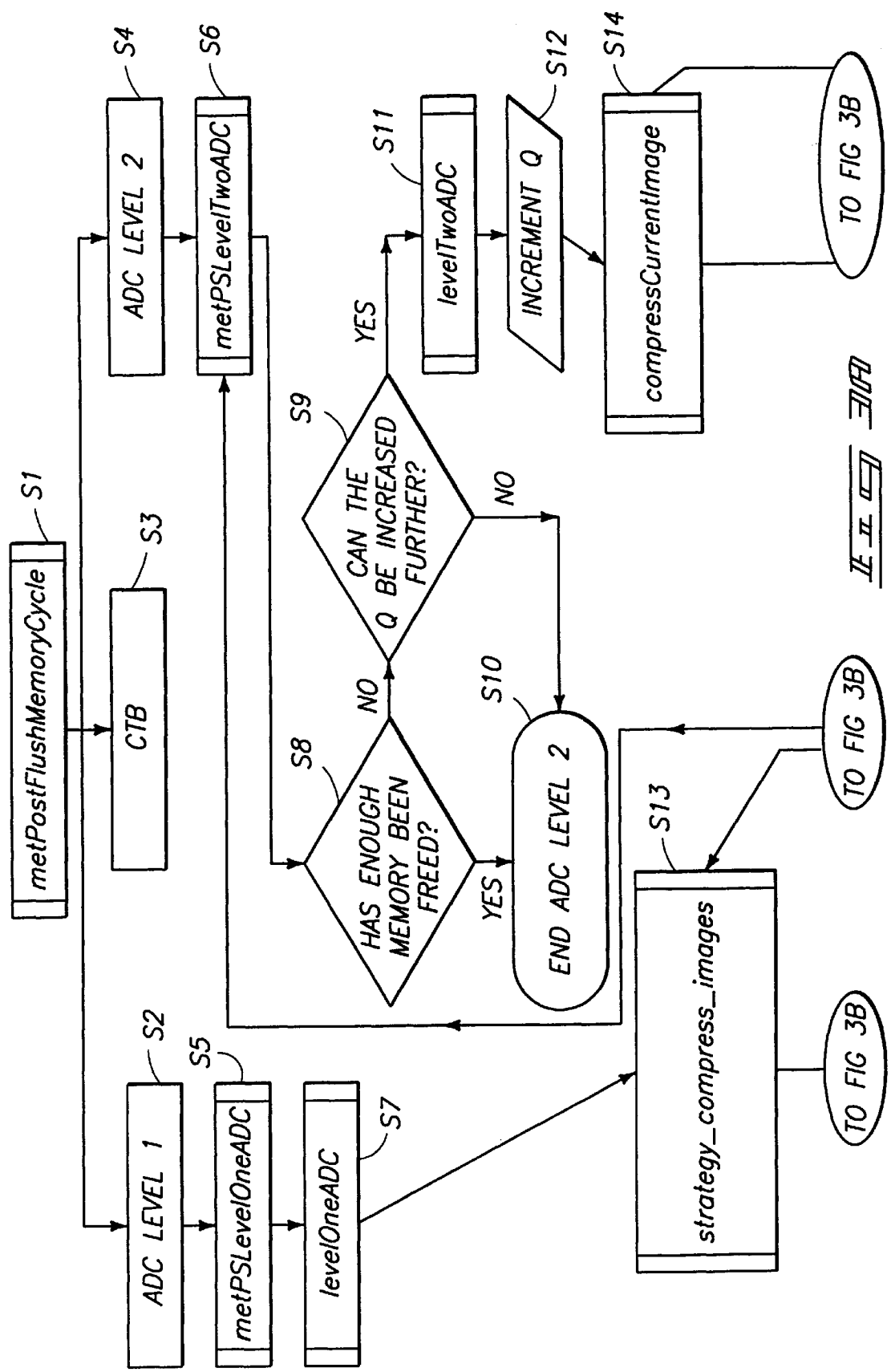

MODIFICATIONS OF POSTSCRIPT ADAPTIVE DATA COMPRESSION (ADC) FOR 3 PLANE, 8 BIT COLOR IMAGES, JPEG LOSSY COMPRESSION, AND VARIABLE Q FACTORS

FIELD OF THE INVENTION

This invention relates to the handling of image data, and more particularly to the processing and/or compression of image data such as color images.

BACKGROUND OF THE INVENTION

Data compression, or compacting of data, has been applied to compress data and reduce the number of bits required to represent data, such as image data. There exist quite a few different techniques for data compression in the prior art. Complex data processing equipment is required for achieving the highest levels of data compression, and the execution is often slow. Less complex data processing equipment is required for achieving lower levels of data compression, but execution is typically faster. Typically, a compromise is reached between system complexity and time of execution versus a desired level of data compression.

Earlier page printing techniques involved one bit, one plane, monochrome image data. Recently, color printing has become popular. Some recent attempts to realize color printing have used less than an eight bit, three plane implementation such that it is not possible to realize all colors within a color spectrum. In order to realize a full color spectrum, it becomes necessary to use eight bit, three plane image data which requires a significantly increased amount of memory resulting from the significantly increased amount of data. Hence, a 24-fold increase is made in image data size between one bit, one plane image data and eight bit, three plane image data.

Another prior art technique involves storing a full raster bit of an entire page such that a print mechanism always has rasterized data awaiting action. However, recent increases in print resolution from 300 dpi to 600 dpi have quadrupled the raster memory needs. Therefore, additional raster memory is required in order to run a printer at higher resolutions and with multiple colors. However, to remain cost competitive, manufacturers have been forced to direct substantial efforts towards reducing the amount of required memory in a laser printer.

Personalities have been used to describe the markings and formatting that is placed onto a page. A personality is a page description language (PDL). During formatting, data is received from a host computer and is converted into a list of display commands. The display commands are simple commands that describe what must be printed. The display command list is prepared for printing and involves a parsing of the display commands and a rendering of the described objects into a raster bit map. However, there are pitfalls when generating a display list since there is typically not enough memory in the display list and the display list is likely to run out of memory. Once the display list has been fully built, it is blitted into strip buffers and sent off to the print engine.

In order to meet the demands of modern printers, which can have resolutions of 600 dpi or greater, general purpose data compression techniques have been used to minimize the amount of memory required by a printer.

In the past, a number of techniques have been developed for compressing and processing images. One technique involves the use of Adaptive Data Compression (ADC). U.S. Pat. No. 5,479,587 to Campbell et al., assigned to the Assignee, discloses details of adaptive data compression (ADC) as presently understood in the art. U.S. Pat. No. 5,479,587 is incorporated herein by reference as detailing present knowledge within the art. However, Adaptive Data Compression (ADC) can only process 1 bit, 1 plane monochrome image data. Furthermore, ADC implementations could not JPEG compress the image data. Hence, there exist additional needs to compress multiple dimension image data, and to provide for JPEG compression.

U.S. Pat. No. 5,677,689 to Yovanof et al. discloses details of JPEG image compression that uses an estimated Q-factor value when compressing an arbitrary image to a predetermined fixed size file. U.S. Pat. No. 5,677,689 is incorporated herein by reference as evidencing present knowledge within the art.

JPEG stands for the Joint Photographic Experts Group. JPEG comprises a lossy image-compression algorithm that often reduces the size of bitmapped images by a factor of 10 or more with little or no discernible image degradation. JPEG compression works by filtering out an image's high-frequency information to reduce the volume of data and then compressing the resulting data with a compression algorithm. Low-frequency information does more to define the characteristics of an image, so losing some high frequency information does not necessarily affect the image quality.

Prior art solutions are not capable of implementing adaptive data compression (ADC) in a manner that enables processing of 8 bit, 3 plane color data, particularly with a minimized allocation of memory. Additionally, prior art solutions are not capable of JPEG compressing image data. Therefore, there exists a need for implementing adaptive data compression (ADC) capable of processing 8 bit, 3 plane color data, which is 24 times larger than 1 bit, 1 plane monochrome image data.

This invention relates to improvements to adaptive data compression in order to realize even greater compression ratios while concerning memory.

SUMMARY OF THE INVENTION

This invention solves the problem of JPEG compressing data via an adaptive data compression implementation. More particularly, this invention solves the problem of processing 8 bit, 3 plane color data, which is 24 times larger than 1 bit, 1 plane data, while enabling JPEG compression of the data. Even more particularly, this invention enables the use of an adjustable Q factor when implementing a JPEG compressor in order to achieve needed compression ratios.

According to one aspect of the invention, an image compression system includes a source, a memory, a personality/graphics engine having a personality and a graphics engine, a memory allocator and an image processor. The source is operative to supply digital data representative of images. The memory has a finite size for receiving the digital data. The personality is configured to interpret an input file and is operative to construct image patches from the digital data. The graphics engine is operative to generate a display list from the memory. The memory allocator is associated with the memory and is operative to allocate image patches. The image processor includes a JPEG compressor and a JPEG decompressor. The image processor is operative to render the display list into strip buffers. The JPEG compressor is operative to JPEG compress images on the display list. The JPEG decompressor is operative to decompress compressed images on the display list. The image processor is operative to uncompress the compressed patch data and copy each bit in the image patch into the strip buffers.

According to another aspect of the invention, a method is provided for compressing 8 bit, 3 plane color image data provided in three distinct image planes. The method includes the steps of: providing a source of digital data representative of color images; requesting an allocation of free memory sufficient to receive an uncompressed image patch into the free memory; when the memory request cannot be satisfied because of insufficient free memory, cycling through every image patch on the display list and/or image patches on the current image stored in memory; for each image patch having a Q factor below the current Q factor, compressing the image patch to the current Q factor; increasing the current Q factor to a next higher level Q factor; comparing all images patches that are part of the current image with the next higher level current Q factor; for each image patch that is not compressed to at least the next higher level current Q factor, JPEG compressing each image patch to the next higher level current Q factor; repeating the steps of compressing, increasing and comparing until at least enough memory is provided for receiving at least one uncompressed image patch into memory; constructing image patches from the digital data; and placing the image patches onto a display list within memory.

Objects, features and advantages are to provide an apparatus and method for compressing image data with a minimized amount of memory so as to reduce system cost and complexity, while enhancing image transfer and compression characteristics in a manner that is reliable and accurate.

DESCRIPTION OF THE DRAWINGS

Preferred embodiments of the invention are described below with reference to the following accompanying drawings depicting examples embodying the best mode for practicing the invention.

FIGS. 3A and 3B together form a flowchart illustrating the steps of allocating memory when a personality determines that there is not enough free memory for an image transfer.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Figure 1:
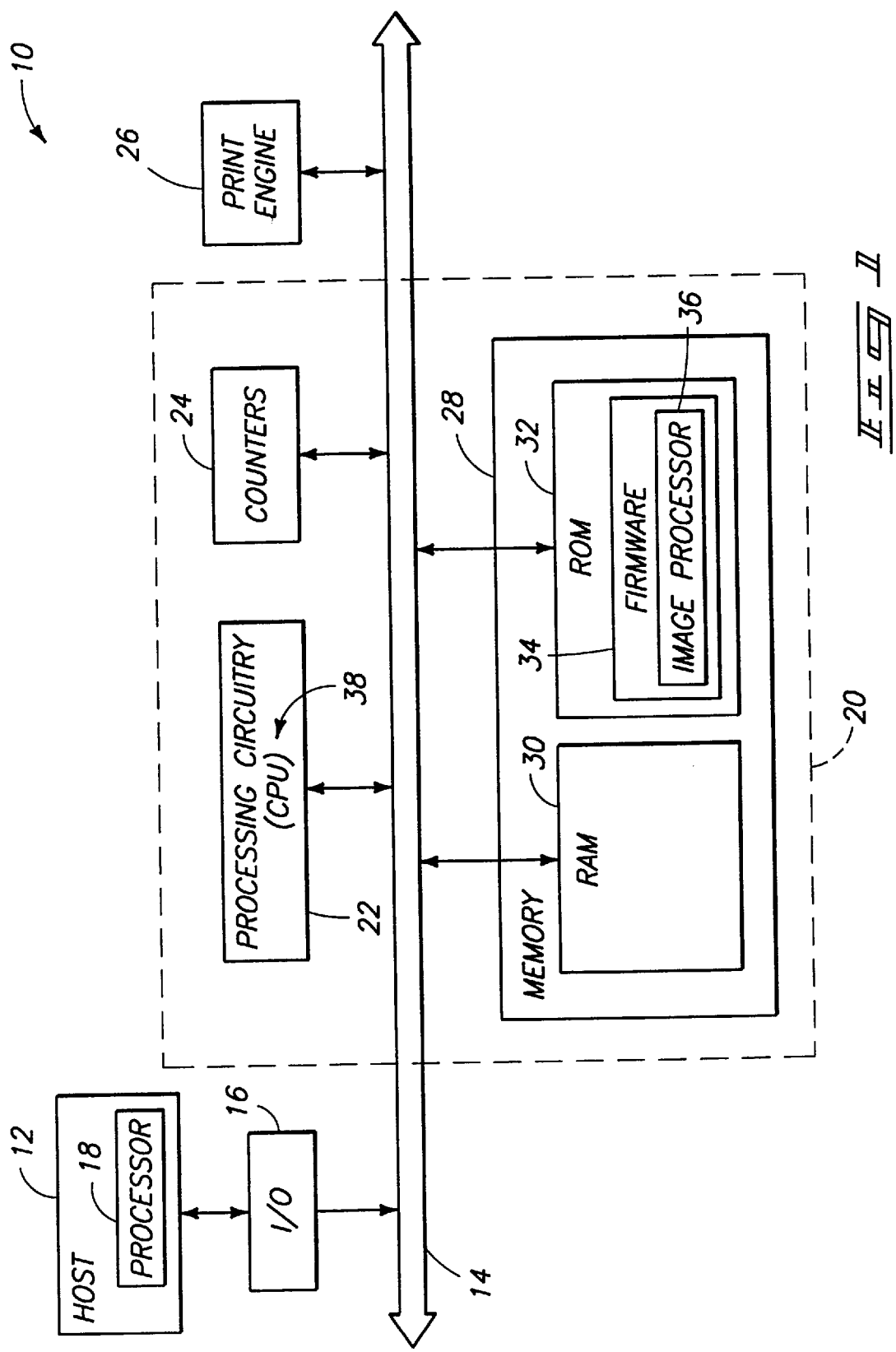
FIG. 1 is a functional block diagram of a printer system having image compression and memory allocation features according to the present invention.

A preferred embodiment of the invention is illustrated in the accompanying drawings particularly showing a printing system for allocating memory and transferring images without degrading the image generally designated with reference numeral 10 in FIG. 1. Printer 10 is shown coupled with a host computer 12 via a bus 14 of printer 10. Host 12, containing a processor 18, is coupled with bus 14 via an input/output (I/O) port 16. Printer 10 includes an image formatter 20 having a central processing unit (CPU) 22, a plurality of counters 24, a print engine 26 and memory 28. According to one construction, print engine 26 comprises a laser printer which operates at a constant speed. Accordingly, print engine 26 is provided with video raster print data in a manner that saves space.

Memory 28 includes random access memory (RAM) 30 and read only memory (ROM) 32. RAM 30 and ROM 32 are connected to bus 14 and contain all of the procedures necessary to assure that available RAM 30 is most effectively used, and that print engine 26 has data awaiting printing so as to avoid print overruns.

Printer 10 comprises a page printer that receives image data from a host processor via I/O 16. RAM 30 is sized sufficiently to provide memory that is available to store the received image data, but is substantially less than that required to store an entire video raster bit-map image of a page. The size of RAM 30 is constrained so as to enable printer 10 to be marketed at the lowest competitive price.

ROM 32 includes firmware 34, particularly where program code is held in ROM 32. Firmware comprises an image processor 36 that is implemented via a processing circuitry 22 of image formatter 20. According to one implementation, image processor 36 is realized as firmware enabled via a central processing unit (CPU) 38 of image formatter 20.

Figure 2:
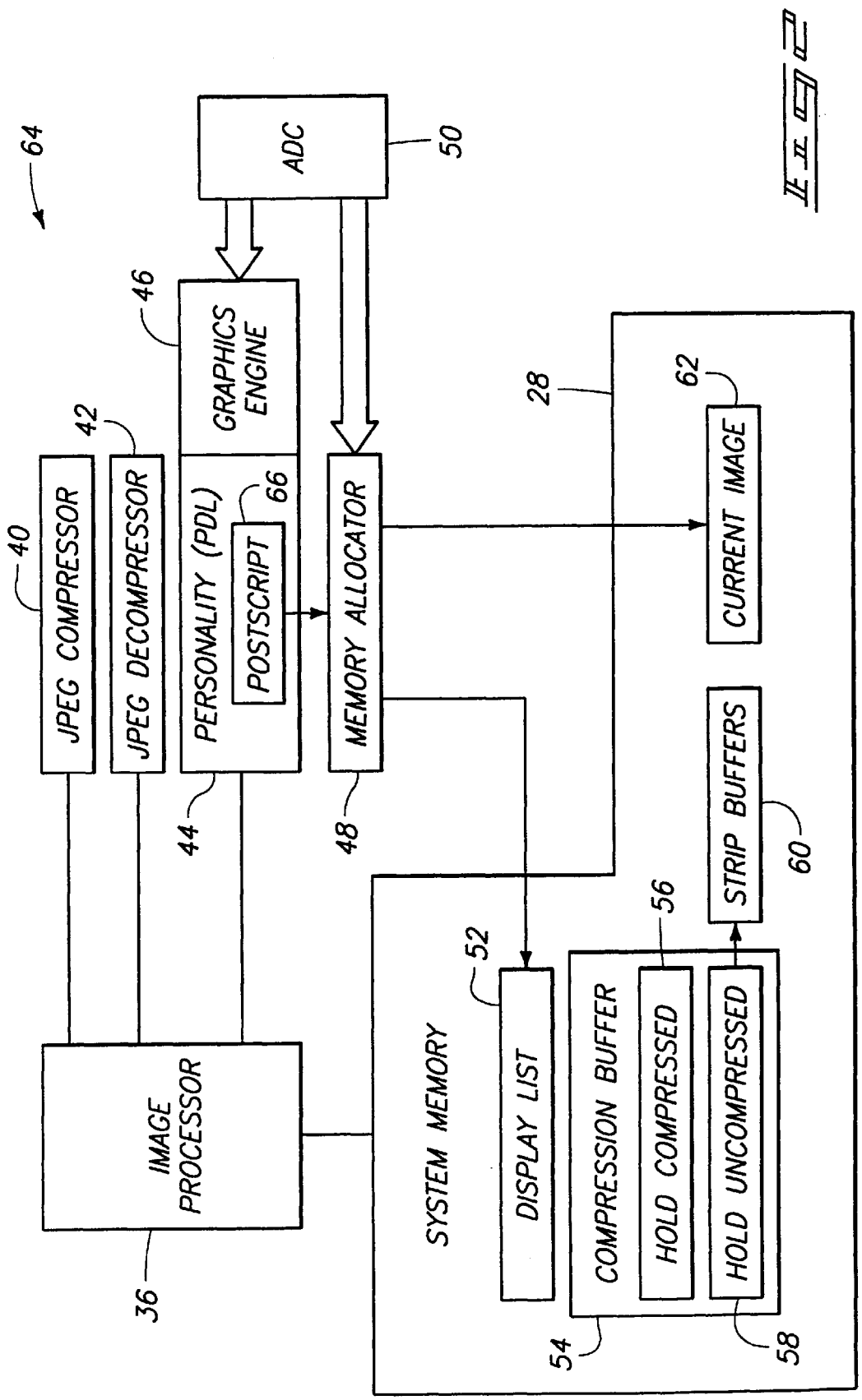
FIG. 2 is a functional block diagram further illustrating an image compressor and an image decompressor used with the printer system of FIG. 1.

FIG. 2 illustrates in functional block diagram form various components associated with a personality making a memory request that cannot be satisfied because of insufficient free memory. An image compression system 64 is shown as memory 28, image processor 36, a JPEG compressor 40, a JPEG decompressor 42, a personality 44, a graphics engine 46, a memory allocator 48 and an adaptive data compression (ADC) process 50.

JPEG is a presently understood technology already described above with reference to the background of the invention. JPEG provides a still image compression standard. Lossy compression is employed to control the size of a compressed image so that the image does not exceed the capacity of a fixed-size memory, or buffer. The control of image size is desirable when transferring images from computers to printers, between computers, and from digital imaging devices, such as cameras, to printers and storage or other forms of output devices.

Memory enhancement technology (MEt) is a presently understood technology developed by Hewlett-Packard Company of Palo Alto, Calif. More particularly, MEt is an implementation for reducing memory corruption for imbedded systems.

Adaptive data compression (ADC) 50 is a part of memory enhancement technology (MEt). It is a memory enhancement technique which functions by compressing image data to the level required to free a sufficient amount of memory.

Prior implementations of adaptive data compression (ADC) have only been capable of processing 1 bit, 1 plane monochrome image data. Such prior art techniques have until now been unable to JPEG compress image data. According to Applicant's invention, adaptive data compression (ADC) 50 is implemented in a manner that enables the processing of 8 bit, 3 plane color data. Such data is 24 times larger than 1 bit, 1 plane data which makes data compression and memory size requirements significantly more complicated. Because of the much larger size relating to color image data; e.g., the unique characteristics of 8 bit, 3 plane color data, there exists a need to enhance adaptive data compression (ADC) 50 by enabling the ability to JPEG compress the color image data.

Image compression system 64 resolves a further need by providing adaptive data compression (ADC) 50 such that JPEG compressor 40 utilizes a variable Q compression factor, or Q factor. Such variable Q factor enables the gradual increasing, as necessary, the Q factor used by the JPEG compressor in order to achieve a needed compression ratio when receiving color image data.

As shown in FIG. 2, system memory 28 includes a display list 52, a compression buffer 54, a hold compressed memory location 56, a hold uncompressed memory location 58, strip buffers 60 and a current image memory location 62. System memory 28 is divided into such distinct subsystems via memory allocator 48.

Image compression system 64 uses ADC 50 such that 8 bit, 3 plane color image data can be JPEG compressed using a variable Q factor. One advantage provided by such implementation results in that large, 8 bit, 3 plane color images can be printed in a base memory, such as memory 28. Accordingly, the amount of memory within a device, such as a printer, can be kept to a minimum in order to reduce system cost and complexity.

Relatively large compression ratios can be realized with JPEG compressor 40 when coupled with a variable Q compression factor, while maintaining a minimum amount of image quality degradation. According to the construction and operation of system 64, adaptive data compression system 50 enables the freeing-up of memory within a limited memory device where available memory is insufficient when receiving image data, particularly color image data. When personality 44 makes a memory request that cannot be satisfied because of insufficient free memory, a memory enhancement technology (MEt) cycle is invoked. According to this implementation, a memory enhancement technology (MEt) cycle is implemented in several stages; namely, adaptive data compression (ADC) 50 is implemented as a two-stage process consisting of an ADC level 1 and an ADC level 2 stage. Each of stages 1 and 2 are implemented in order to free memory so that, upon completion of the "MEt" cycle, enough memory 28 is freed up in order to satisfy the initial memory request. Such memory enhancement technology (MEt) cycle is used in an attempt to free up more memory on display list 52. Such attempt comprises getting more memory allocated so that more objects can be placed on display list 52.

Implementation of ADC level 1 comprises cycling through image patches on display list 52, as well as the image patches belonging to the current image 62 being processed. For every image patch that is not compressed to at least the current Q compression factor, the image patch is JPEG compressed to the current Q factor. In order to JPEG compress an image patch via JPEG compressor 40, each plane of data in the image patch must first be padded such that the dimensions of the data are multiples of 8×8 bytes. For the case of color image data, three planes are provided; namely, for cyan, yellow and magenta planes of image data. Such padding is necessary because JPEG compressor 40 is configured to only work with 8×8 byte data. During implementation, ADC level 1 is used to run through all image patches exactly once.

Implementation of ADC level 2 follows ADC level 1. ADC level 2 first increases the value for the current Q factor to a new, next higher level. ADC level 2 then cycles through only those image patches that are identified as being part of the current image 62 being processed. For every image patch within current image 62 that is not compressed to at least the current Q factor, JPEG compressor 40 JPEG compresses the image patch to the current Q factor. ADC level 2 is used to continue to increase the Q factor and recompress the image patches to the new increased Q factor until at least enough memory 28 is freed to receive one uncompressed image patch.

Once personality 44 has finished with a particular page, comprising image data, image processor 36 uncompresses the compressed patch data via JPEG decompressor 42, and blit the uncompressed patch data into strip buffers 60. Blit refers to bit copying or copying of each bit within an image patch into strip buffers 60. When bit copying, care is taken to bit copy only the actual image data and not the pad or padding mentioned above.

As shown in FIG. 2, system memory 28 is divided up at bootup into separate segments or chunks of RAM. Display list 52 forms one such chunk of memory 28 within RAM. Compression buffer 54 forms another such chunk of memory 28 within RAM into which images are compressed. Hold compressed images segment 56 forms yet another such chunk of memory 28 within RAM for holding compressed images. Hold uncompressed images segment 58 forms even another such chunk of memory 28 within RAM for holding an uncompressed image patch so that it can be padded (if necessary) and then compressed.

Personality 44 comprises a personality component such as PostScript 42. Personality 44 comprises a page description language (PDL). Another page description language is PCL. In operation, personality 44 provides an interpreter for image data. Adaptive data compression (ADC) 50 is implemented within personality 44 and graphics engine 46 when personality 44 is determined to be in need for additional memory, such as when sufficient memory 28 has run out for new image patches to be constructed. Personality 44 provides a way of describing the markings defined on a page to be printed, and encompasses page formatting. In essence, personality 44 describes where to put what in a print job on a specific page.

In operation, personality 44 runs out of memory 28 because image processor 36 tries to build images based upon what input files disclose. Personality 44/graphics engine 64 cooperate to divide an image into logical image patches and invoke the memory allocator 48 to allocate memory for each image patch. Personality 44 functions as an interpreter that parses PostScript files 66, creating a series of patches that represent an image. In essence, personality 44 interprets the PostScript stream.

Graphics engine 46 constructs image patches so as form a collection of image patches. Graphics engine 46 outputs display list 52. The image patches are put on display list 52, after they are finished being processed within current image 62. The image patches put on current image 62 are being generated in process. Such image patches contain only image information, whereas raster data stored in strip buffers 60 contain image, graphics and textual information.

Memory allocator 48 performs memory management functions within firmware, keeping track of what has been allocated within memory 28, and determining what remains free within memory 28. In one case, memory allocator 48 could be a property of an operating system. In another case, memory allocator 48 could be a property of system software.

ADC 50 provides memory management functions. Furthermore, ADC 50 enables certain personality 44/graphics engine 66 functionality in low memory situations. When image processor 36 needs to blit, or bit copy, compressed image patch data, ADC 50 must first decompress the image patch data on the display list 52.

A special section of compression buffer 54 is used to store an image patch that is to be compressed. The first time such image patch is to be compressed, such image patch is padded. When an image patch is to be decompressed, it is first decompressed into a separate section of compression buffer 54. From this special section of compression buffer 54, the patch is fed as input into compressor 40.

A Memory Enhancement Technology cycle involves the process of freeing up more memory 28. In operation, image compression system 64 implements a series of steps shown below with reference to FIGS. 3A and 3B. In summary, an ADC level 1 cycle tries to compress all images that are as of yet uncompressed, up to a certain default level. If this fails to free sufficient memory, a commit-to-buffer (CTB) cycle tries to render everything on display list 52 (of FIG. 2). Hence, CTB makes a pixel-by-pixel representation of the display list, and then compresses the representation just made. CTB compresses the display list by rendering the contents of the display list into strip buffers 60 (see FIG. 2) and compressing the contents of the strip buffers. The contents of the strip buffers are then sent to print engine 46 for each of three planes. Here, 52 strips are used to represent a single, standard 8½"×11" page. Once CTB has rendered the display list, it is deallocated. After the strip buffers have been sent to the print engine, their contents are freed. More specifically, such strips are first decompressed, then sent to the print engine, one strip at a time, after the personality has finished processing the input file. If the CTB cycle has failed to free sufficient memory, an ADC level 2 cycle is implemented, which goes through any image patches that are left until a certain level of memory is freed up. At this point the only image patches left are those which belong to the current image, since the images on the display list have been committed to the strip buffers.

Figure 3B:
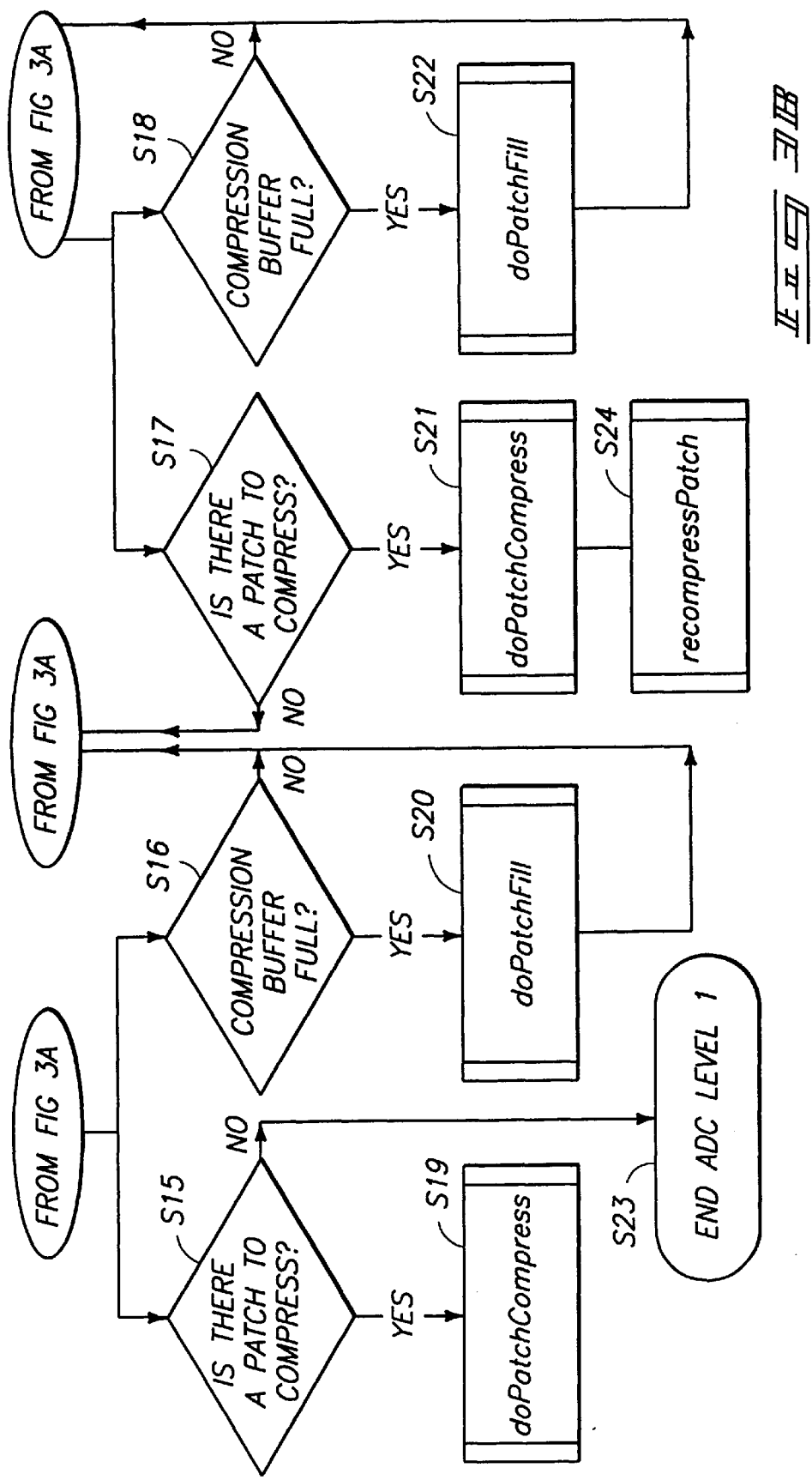

FIGS. 3A and 3B together show a flowchart illustrating implementation of a partial MEt cycle, specifically detailing "ADC Level 1" and "ADC Level 2". A MEt cycle is triggered by the inability of the memory allocator to satisfy a request from the personality for a new memory allocation. For purposes of FIGS. 3A and 3B, functional name blocks are depicted as a rectangular box with two additional vertical parallel lines. A general process block is illustrated as a plain rectangular box. A decision is illustrated as a decision diamond. Finally, an end of process step is illustrated as a long oval.

As shown in FIGS. 3A and 3B, Step "S1" illustrates a function block for "metPostFlushMemoryCycle". According to Step "S1", personality 44 (of FIG. 2) tries to make a new memory allocation, but it is determined that there is not enough free memory to do so. Hence, "metPostFlushMemoryCycle" is called pursuant to Step "S". The purpose of "metPostFlushMemoryCycle" is to free up memory. Step "S1" tries to do so by invoking a variety of techniques, including ADC Level 1, CTB, and ADC Level 2. If enough memory is freed after invoking any one of these techniques, "metPostFushMemoryCycle" returns and does not invoke the remaining techniques depicted in FIGS. 3A and 3B.

Step "S2" implements ADC Level 1. According to Step "S2", ADC Level 1 compresses any uncompressed image patches to the current Q compression factor. For purposes of this implementation, the current Q factor is initially set to 25, but can be incremented (via ADC Level 2) to a much higher value. More particularly, ADC Level 1 walks through the entire display list, looking for image patches. For every uncompressed image patch that is found, ADC level 1 compresses that image patch into compression buffer 54 (of FIG. 2). For purposes of this disclosure, it is understood that the compression buffer is a large chunk of memory which is set aside at system initialization for use by ADC and, after the personality is finished with the page, for use by other parts of the system. When the compression buffer becomes full, or when all of the image patches have been compressed into it, the compressed patches in the compression buffer are copied back into normal memory, replacing their uncompressed counterparts, and the compression buffer is then considered empty.

When Step "S2", or "ADC Level 1", has finished walking through the entire display list, it then attends to the current image, if there is one. Here, the current image is the image which the personality is currently building, and such image does not yet reside on the display list. "ADC Level 1" compresses every uncompressed image patch that makes up the current image, in exactly the same manner as it compresses every uncompressed image patch that resides on the display list.

When "ADC Level 1" of Step "S2" is finished, all image patches are guaranteed to be compressed to the current Q factor. ADC Level 1 compresses only uncompromised image patches, and treats all such patches whether they are a part of the current image, or reside on the display list.

According to Step "S3", commit-to-buffer "CTB" renders and compresses the entire display list, including images, vectors, and text, into strip buffers 60 (see FIG. 2). Hence, after cycling through "CTB" once, the entire display list is blown away, and everything is as compressed as it can be, except for any current image (if there is one). Such a current image does not reside on the display list. Therefore, if there is still not enough memory free after a "CTB" cycle, then the only option left is to compress the current image even harder than it is already.

According to Step "S4", "ADC level 2" is used to increment the current Q factor, and then recompress every image patch to the new current Q factor. "ADC level 2" only treats the image patches that belong to the current image, because no other image patches exist at this point, since the display list has been blown away by "CTB". ADC level 2 will continue to increment the current Q factor and recompress all of the image patches to the new Q factor until enough memory has been freed, or until the current Q can no longer be incremented. According to one implementation, both of these values are hard-coded.

In operation, "ADC Level 2" of Step "S4" uses the same compression buffer 54 (of FIG. 2) as "ADC Level 1" of Step "S2", but it uses the compression buffer a bit differently. "ADC Level 2" first must decompress each image patch into a special section of the compression buffer which is large enough to hold one maximum-sized image patch. Then that section of the buffer is fed as input to the compressor, the output being another section of the buffer. Hence, "ADC Level 2" uses the compression buffer both for compression and decompression.

According to Step "S5", "metPSLevelOneADC" is implemented, basically just calling "levelOneADC" in Step "S7".

According to Step "S7", "levelOneADC" is implemented. "levelOneADC" sets a few key flags, then calls Step "S13", or "strategy compress _images".

According to Step "S13", "strategy_compress_images" is implemented to walk through the display list looking for image patches. For every image patch that is found, "strategy_compress_images" calls "doPatchCompress" at Step "S19" to compress the found image patches, one at a time, into the compression buffer.

After compressing each patch, the compression buffer is checked to see if it is full according to Step "S16". If the compression buffer is full, "doPatchFill" is called via Step "S20" in order to copy the compressed patches back to normal memory and empty the compression buffer.

When "doPatchCompress" of Step "S19" has been called for all patches, "doPatchFill" of Step "S20" is called one last time to copy the remaining compressed patches into normal memory within system memory 28 (of FIG. 2). When the entire display list has been traversed, Steps "S19" and "S20" as discussed above are performed on the image patches of the current image.

According to Steps "S19" and "S21", "doPatchCompress" is implemented. For ADC Level 1, "doPatchCompress" is implemented via Step "S19" such that shadow and raster data are copied to a special section of compression buffer 54 (of FIG. 2). The shadow data and each plane of the raster data are then padded such that the data is 8×8 bytes, which is necessary for JPEG compressor 40 (of FIG. 2).

For "ADC Level 1", space is reserved in compression buffer 54 (of FIG. 2) to hold the compressed data, increasing this space as needed in order to ensure that it is cache-word aligned. This ensures that all buffer segments are 8×8 bytes, which again is necessary for JPEG.

Furthermore, for "ADC Level 1" the JPEG compression function is invoked with a variety of parameters including pointers to each plane of padded raster data, since the compressor must JPEG compress each plane individually.

For "ADC Level 2", "recompressPatch" is called.

Steps "S20" and "S22" both realize "doPatchFill", one within ADC Level 1 and the other within ADC Level 2. For ADC Level 1, "doPatchFill" of Step "S20" frees the original, uncompressed patch data. "DoPatchFill" then copies the newly compressed patches from the compression buffer back into normal memory.

For ADC Level 2, "doPatchFill" of Step "S22" frees the old compressed patches that reside in normal memory. "doPatchFill" of Step "S22" also copies the newly recompressed patches from the compression buffer back into normal memory.

Step "S6" is used to implement "metPSLevelTwoADC" which checks if enough memory has been freed (see Step "S8"). If enough memory has been freed up, the process returns it to "metPostFlushMemoryCycle" at Step "S1". At this point, "ADC Level 2" is finished. If enough memory has not been freed up, "metPSLevelTwoADC" at Step "S6" checks to see if the current Q factor can be incremented. If the current Q factor can be incremented, "metPSLevelTwoADC" calls "levelTwoADC" at Step "S11". If the current Q factor can not be incremented, "metPSLevelTwoADC" returns to "metPostFlushMemoryCycle" at Step "S1". At this point, "ADC Level 2" is finished, and it has failed.

According to Step "S11", "levelTwoADC" is implemented to increment the current Q factor. Furthermore, "levelTwoADC" calls "compressCurrentImage" at Step "S14".

According to Step "S14", "compresscurrentImage" is implemented such that all image patches in the current image are walked through. "compresscurrentImage" then calls Step "S21 " to implement "doPatchCompress". "doPatchCompress" calls "recompressPatch at Step "S24" for each image patch that is walked through.

Step "S14" "compressCurrentImage" then dissects recompressed patches back into normal memory via Step "S22" "doPatchFill". "compressCurrentImage" then returns the number of bytes that have been freed up.

According to Step "S24" "recompressPatch" is implemented to copy shadow data into a special section of the compression buffer. Step "S24" "recompressPatch" also decompresses all 3 planes of raster data into the special section. Furthermore, Step "S24""recompressPatch" reserves space in compression buffer 54 (of FIG. 2) to hold the compressed data, increasing this space as needed in order to ensure that it is cache-word aligned. This ensures that all buffer segments are 8×8 bytes which is necessary for JPEG implementation.

Finally, Step "S24" "recompressPatch" recompresses each plane of data into compression buffer 54 by invoking JPEG compression functionality via JPEG compressor 40 (of FIG. 2) with a variety of parameters including pointers to each plane of padded raster data.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An image compression system, comprising:
    a source for supplying digital data representative of images;
    a memory having a finite size for receiving the digital data;
    a personality/graphics engine component having a personality and a graphics engine, the personality configured to interpret an input file and operative to construct image patches from the digital data, the graphics engine operative to generate a display list from the memory;
    a memory allocator associated with the memory and operative to allocate image patches;
    an image processor including a JPEG compressor and a JPEG decompressor, the image processor operative to render the display list into strip buffers, the JPEG compressor operative to JPEG compress images on the display list, the JPEG decompressor operative to decompress compressed images on the display list, the image processor operative to uncompress compressed patch data and copy each bit in the image patch into the strip buffers.

2. The system of claim 1 wherein the memory includes a compression buffer.

3. The system of claim 2 wherein the compression buffer includes a hold compression section and a hold uncompression section.

4. The system of claim 1 wherein the JPEG compressor compresses each patch of data that is not compressed to at least a current Q, to the current Q.

5. The system of claim 1 wherein the personality is a page description language (PDL).

6. The system of claim 1 wherein the memory allocator comprises adaptive data compression (ADC).

7. The system of claim 1 wherein the source receives digital data comprising a print job.

8. The system of claim 1 wherein the JPEG compressor comprises a variable Q factor, the JPEG compressor adjustable so as to increase the Q factor to a level sufficient such that at least enough memory is provided for receiving at least one uncompressed image patch into memory.

9. A memory storage and enhancement device, comprising:
    a source for supplying digital data representative of images;

memory for receiving the digital data;

a personality;

a graphics engine associated with the personality, the personality configured to interpret an input file and operative to construct image patches from the digital data, the graphics engine operative to generate a display list from the memory;

a memory allocator coupled with the memory and operative to allocate image patches;

a JPEG compressor operative to JPEG compress images on the display list;

a JPEG decompressor operative to decompress compressed images on the display list;

processing circuitry coupled with the JPEG compressor and the JPEG decompressor, the processing circuitry operative to render the display list into strip buffers, the processing circuitry further operative to uncompress compressed patch data and copy each bit in each image patch into the strip buffers.

10. The device of claim 9 wherein the memory allocator comprises memory management firmware.

11. The device of claim 9 wherein the processing circuitry comprises an image processor.

12. The device of claim 9 wherein the processing circuitry receives an image input file comprising a PostScript file.

13. The device of claim 9 wherein the JPEG compression unit comprises a variable Q factor Adaptive Data Compression (ADC) unit.

14. The device of claim 9 wherein the memory comprises random access memory (RAM), the display list allocatable within the memory, and strip buffers further allocatable within the memory.

15. A method for compressing 8 bit, 3 plane color image data provided in three distinct image planes, comprising the steps of:

providing a source of digital data representative of color images;

requesting an allocation of free memory sufficient to receive an uncompressed image patch into the free memory;

when the memory request cannot be satisfied because of insufficient free memory, cycling through every image patch on a display list and/or image patches on the current image stored in memory;

for each image patch having a Q factor below the current Q factor, compressing the image patch to the current Q factor;

increasing the current Q factor to a next higher level Q factor;

comparing all image patches that are part of the current image with the next higher level current Q factor;

for each image patch that is not compressed to at least the next higher level current Q factor, JPEG compressing each image patch to the next higher level current Q factor;

repeating the steps of compressing, increasing and comparing until at least enough memory is provided for receiving at least one uncompressed image patch into memory;

constructing image patches from the digital data; and placing the image patches onto a display list within memory.

16. The method according to claim 15 wherein prior to JPEG compressing each image patch, padding each plane of data within an image patch.

17. The method according to claim 16 wherein the step of padding comprises reconfiguring the dimensions of image data to be multiples of 8×8 bytes.

18. The method according to claim 15 further comprising strip buffers.

19. The method according to claim 15 wherein a graphics engine is used to generate the display list.

20. The method according to claim 15 wherein the steps of cycling, comparing, increasing, and JPEG compressing comprises implementing adaptive data compression.

* * * * *